(12) United States Patent
Ashraf et al.

(10) Patent No.: US 11,514,094 B2
(45) Date of Patent: Nov. 29, 2022

(54) SEARCH AND NAVIGATION OF HIDDEN ELEMENTS OF A WEB PAGE

(71) Applicant: INTERNATIONAL BUSINESS MACHINES CORPORATION, Armonk, NY (US)

(72) Inventors: Uwais Ashraf, Chandler's Ford (GB); Craig J. Morten, Woking (GB); Alexander Horsfield, Eastleigh (GB); Nicholas Wilkin, Woking (GB)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 247 days.

(21) Appl. No.: 15/889,240

(22) Filed: Feb. 6, 2018

(65) Prior Publication Data

US 2019/0243918 A1    Aug. 8, 2019

(51) Int. Cl.
*G06F 16/33* (2019.01)
*G06F 16/93* (2019.01)
*G06F 16/338* (2019.01)
*G06F 3/04842* (2022.01)

(52) U.S. Cl.
CPC ........ *G06F 16/338* (2019.01); *G06F 3/04842* (2013.01); *G06F 16/334* (2019.01); *G06F 16/93* (2019.01)

(58) Field of Classification Search
CPC ...... G06F 16/338; G06F 16/93; G06F 16/334; G06F 3/04842; G06F 16/148; G06F 16/9535; G06F 16/951; G06F 16/957; G06F 16/95; G06F 16/24575; G06F 16/9566; G06F 16/9038; G06F 16/35; G06F 16/24578; G06F 16/972; G06F 16/2365; G06F 16/9577; G06F 40/106; G06F 16/168; G06F 16/958; G06F 16/00; G06F 16/176; G06F 16/113; G06F 16/13; G06F 16/156; G06F 16/16; G06F 16/18; G06F 16/182; G06F 16/907; G06F 16/9536;
(Continued)

(56) References Cited

U.S. PATENT DOCUMENTS 7,346,605 B1\* 3/2008 Hepworth ............. G06F 16/338
707/999.005
7,831,918 B2\* 11/2010 Marini ...................... G06F 8/38
715/762
(Continued)

OTHER PUBLICATIONS

Smarty, 3 Simple Tools to Find Hidden Links (and Text), Mar. 17, 2010, Search Engine Journal, Tools & Analytics, pp. 1-6.
(Continued)

*Primary Examiner* — Son T Hoang
(74) *Attorney, Agent, or Firm* — Anthony Curro

(57) ABSTRACT

A system, method and computer program product for a search tool is provided. A user-input search term is received in a search tool for finding instances of the search term in a document currently presented to the user. An instance of the search term in a hidden content element of the document is identified. A content element is determined for exposing the hidden content element. The determined content element is presented to the user and highlighted, to prompt user interaction therewith so as to expose the hidden content element.

9 Claims, 4 Drawing Sheets

(58) Field of Classification Search
CPC ...... G06F 16/954; G06F 16/14; G06F 16/248; G06F 16/3334; G06F 16/44; G06F 16/583; G06F 16/953
See application file for complete search history.

(56) References Cited

U.S. PATENT DOCUMENTS

| | | | | |
|---|---|---|---|---|
| 8,176,412 | B2* | 5/2012 | Bhandar | G06F 40/186 |
| | | | | 715/235 |
| 8,392,823 | B1* | 3/2013 | Schneider | G06F 16/951 |
| | | | | 715/234 |
| 8,686,944 | B1* | 4/2014 | Charlton | G06F 3/0362 |
| | | | | 345/184 |
| 8,725,729 | B2* | 5/2014 | Lisa | G06F 16/951 |
| | | | | 707/758 |
| 9,336,279 | B2* | 5/2016 | Ciccolo | G06F 40/143 |
| 9,349,085 | B1* | 5/2016 | Leland | H04N 1/32341 |
| 9,501,460 | B1 | 11/2016 | Battre et al. | |
| 2002/0099717 | A1* | 7/2002 | Bennett | G06Q 10/10 |
| 2008/0071743 | A1* | 3/2008 | Jhaveri | G06F 16/951 |
| 2008/0092060 | A1* | 4/2008 | Berg | G06F 16/958 |
| | | | | 715/748 |
| 2009/0113475 | A1* | 4/2009 | Li | G06F 16/78 |
| | | | | 704/270.1 |
| 2010/0205541 | A1* | 8/2010 | Rapaport | G06F 16/285 |
| 2011/0113321 | A1* | 5/2011 | Han | G06F 3/1206 |
| | | | | 715/234 |
| 2013/0091415 | A1* | 4/2013 | Stilling | G06F 16/957 |
| | | | | 715/234 |
| 2013/0332819 | A1* | 12/2013 | Avritch | G06Q 30/02 |
| | | | | 715/234 |
| 2014/0101136 | A1* | 4/2014 | Mizuno | G06F 16/951 |
| | | | | 707/722 |
| 2014/0222786 | A1* | 8/2014 | Job | G06F 16/9535 |
| | | | | 707/722 |
| 2015/0222660 | A1* | 8/2015 | Li | H04L 67/02 |
| | | | | 726/23 |
| 2016/0283598 | A1* | 9/2016 | Bell | G06F 16/951 |
| 2018/0024969 | A1* | 1/2018 | Khoo | G06F 16/93 |
| 2018/0210643 | A1* | 7/2018 | Ghassabian | G06F 3/0237 |

OTHER PUBLICATIONS

Van Der Zee, "Finding Hidden Links and Text Using the Web Developer Toolbar," Mar. 31, 2009, Moz, Inc., Blogging, pp. 1-6.
Mohanty, "Google Showing Hidden Content in Answer Box," Posted on: Aug. 3, 2015, Suvaance.com, pp. 1-5.

* cited by examiner

SEARCH AND NAVIGATION OF HIDDEN ELEMENTS OF A WEB PAGE

BACKGROUND

The present disclosure relates to improvements in search and navigation tools for computing applications and, more specifically, to systems and methods for the improved search, identification and display of search terms, such as text strings or other objects, by a search tool in response to a search query for the search term.

SUMMARY

According to an aspect of the present disclosure, a computer implemented method is provided. A user-input search term is received in a search tool for finding instances of the search term in a document currently presented to the user. An instance of the search term in a hidden content element of the document is identified. A content element is determined for exposing the hidden content element. The determined content element is presented to the user and highlighted, to prompt user interaction therewith so as to expose the hidden content element.

According to another aspect of the present disclosure, a system is provided. The system comprises a computing device comprising a processing unit and a memory unit. The computing device is configured to present documents to a user and to enable the user to search for search terms using a search tool. The processing unit is configured to receive a user-input search term in a search tool for finding instances of the search term in a document currently presented to the user. The processing unit is configured to determine an instance of the search term in a hidden content element of the document. The processing unit is configured to determine a content element for exposing the hidden content element. The processing unit is configured to presenting the determined content element. The determined content element is highlighted to prompt user interaction therewith so as to expose the hidden content element.

According to yet another aspect of the present disclosure, a computer program product is provided. The computer program product comprises a computer readable storage medium having program instructions embodied therewith. The program instructions are executable by a processor to cause the processor to: receive a user-input search term in a search tool for finding instances of the search term in a document currently presented to the user; determine an instance of the search term in a hidden content element of the document; determine a content element for exposing the hidden content element, and present the determined content element, wherein the determined content element is highlighted to prompt user interaction therewith so as to expose the hidden content element.

BRIEF DESCRIPTION OF THE DRAWINGS

Example implementations of the present disclosure will be described below with reference to the following drawings, in which.

DETAILED DESCRIPTION

Figure 1:
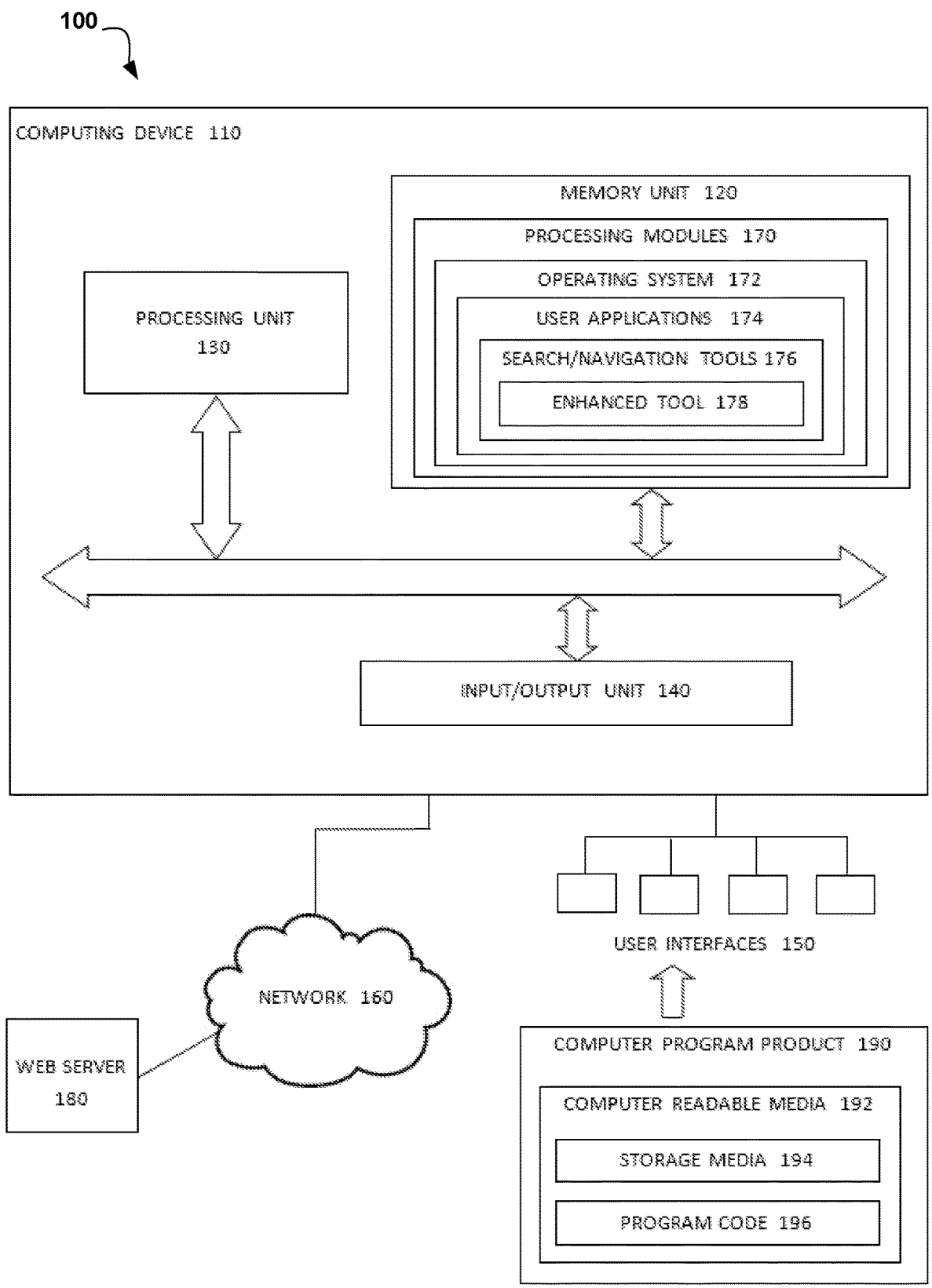
FIG. 1 is a block diagram of a computing system in accordance with example implementations of the present disclosure.

Search and navigation tools are commonly used to guide the navigation of a user, when viewing presented document content associated with one or more computer applications running on a computing device. For example, web browsers and user application programs, such as email applications, word processing applications, spreadsheet applications and the like, may include a "Find" tool to identify a search term, such as a user-input text string or other object. The "Find tool" may be used to identify occurrences or "instances" of the search term in document content that may be currently loaded and presented by the application, such as a html document, email, word processing document or spreadsheet. The "Find" tool locates instances of the search term, and, typically, highlights each identified instance in the presentation to the user (e.g., by highlighting the instances of the search term in a current view of the document on a display screen). This enables the user to quickly identify and view the highlighted parts of the displayed content including the search term of interest.

A problem with the above described "Find" tool is that it may be unable to identify some instances of a search term in the currently presented document. In particular, the "Find" functionality may be unable to identify and highlight instances of the search term in content that is currently hidden from view or is not presented in the current view, for example because it is dynamically created.

For example, consider a scenario in which a webpage (i.e., html document) is currently loaded and presented by a web browser on the display of a user computing device. A user inputs a search term comprising a text string into a "Find" tool associated with the web browser, which identifies instances of the text string in the body of the html document/webpage that is currently loaded and presented to the user. The "Find" tool then highlights the identified instances, which are visible in the current view, as the results of the query on the display. However, further instances of the text string may exist within the Body of the html document/webpage or elsewhere, in particular in content that is not currently loaded and/or is otherwise hidden from view. For example, the content may be hidden within a currently collapsed part of a tree, such as within hidden user comments relating to a blog post or article. In another example, the content may be hidden as a result of a predetermined property (e.g., a setting defined by the webpage designer), such as a CSS property of the webpage/html document. In a further example, the content may be hidden because it is dynamically generated, for example, in response to a defined condition, such as a user input. As the skilled person will appreciate, content may be hidden for many other possible reasons. Such hidden content of the html document/webpage is not loaded by the web browser application, and so is not considered by conventional navigation tools, such as the "Find" tool, to identify and highlight the text string being searched. Thus, conventional search and navigation tools, such as the "Find" tool, may be inaccurate, since they are unable to identify all instances of a search term in response to the user's query, leading to poor user experience.

In the present disclosure, the term "hidden content element" may include content elements within a document which are not shown in the current view of the document presented to the user. This may include content elements that have dynamically created content, that is, element values which are dynamically generated. As the skilled person will appreciate, other reasons for content elements and/or their content to be "hidden" are possible and contemplated by the present disclosure. The term "document" may include any form of computer file (or equivalent) that is presented using a user computing application, including, but not limited to, an email or similar electronic message, an html document (or webpage), a word processing document, a spreadsheet and any other type of document for presentation to a user, whether now known or developed in the future.

The present disclosure provides a method, system and computer program product, which provides improved searching and/or navigation of a document presented by an application, by considering hidden content and enabling query results in such hidden content to be revealed.

FIG. 1 is a block diagram of a computing system 100 in accordance with example implementations of the present disclosure. In particular the computing system 100 may comprise a computing device 110 having a memory unit 120, a processing unit 130 and an input/output unit 140. Computing device 110 may be any type of user device, such as a personal computer, notebook computer, tablet computer, smartphone or other type of user computing device, whether now known or developed in the future. Computing device 110 further includes user interface devices 150 connected to input/output unit 140 or integrated within computing device 110. User interface devices 150 may include one or more of a display (e.g., screen or touchscreen), a printer, a keyboard, a pointing device (e.g., mouse, joystick, touchpad), an audio device (e.g. microphone and/or speaker) and any other type of user interface device. Input/output unit 140 may also be connected to a network 160 to send and receive data to other computing devices connected to the network 160, such as a web server 180. Network 160 may comprise any suitable wired or wireless data communications network, such as a local area network, wide area network or the Internet.

Memory unit 120 of computing device 110 may include processing modules 170, including an operating system module 172 (herein "operating system") and one or more user application modules 174 (herein "user applications") that may run within the operating system 172. Each processing module 170 comprises instructions for execution by processing unit 130 for processing data and/or instructions received from input/output unit 140 and/or data and/or instructions stored in memory unit 120. Examples of operating systems implemented by operating system module 172 include Windows® (Windows® and all Windows®-based trademarks and logos are trademarks or registered trademarks of Microsoft Corporation and/or its affiliates) and macOS® (macOS® and all macOS®-based trademarks and logos are trademarks or registered trademarks of Apple Inc. and/or its affiliates). for desktop computing devices, and Android® (Android® and all Android®-based trademarks and logos are trademarks or registered trademarks of Google Inc. and/or its affiliates) and Apple Inc.'s iOS® (iOS® and all iOS®-based trademarks and logos are trademarks or registered trademarks of Cisco Technology, Inc. and/or its affiliates) for mobile computing devices. As the skilled person will appreciate, the present disclosure is not limited to any particular operating system. Examples of user applications implemented by user application modules 174 include a web browser application, an email application, a word processing application and a spreadsheet application. As the skilled person will appreciate, the present disclosure is not limited to any particular type of application program or software, but may be used in conjunction with any type of user application in which search and navigation tools may be used.

Memory unit 120 may also store processing modules 170 comprising search and navigation tools 176, including enhanced tool module 178 (herein "enhanced tool") comprising instructions for providing enhanced search and navigation of document content, in accordance with the present disclosure. In some example implementations, enhanced tool module 178 may be integrated within the operating system module 172. In other example implementations, the enhanced tool module 178 may be integrated within one or more of the user application modules 174. In further example implementations, the enhanced tool module 178 may be an independent processing module 170, whereby enhanced search and navigation functionality is executed in response to, for example, a triggering event detected during execution of a navigation tool module 176 of a user application module 174, or otherwise within a user computing application.

Figure 2:
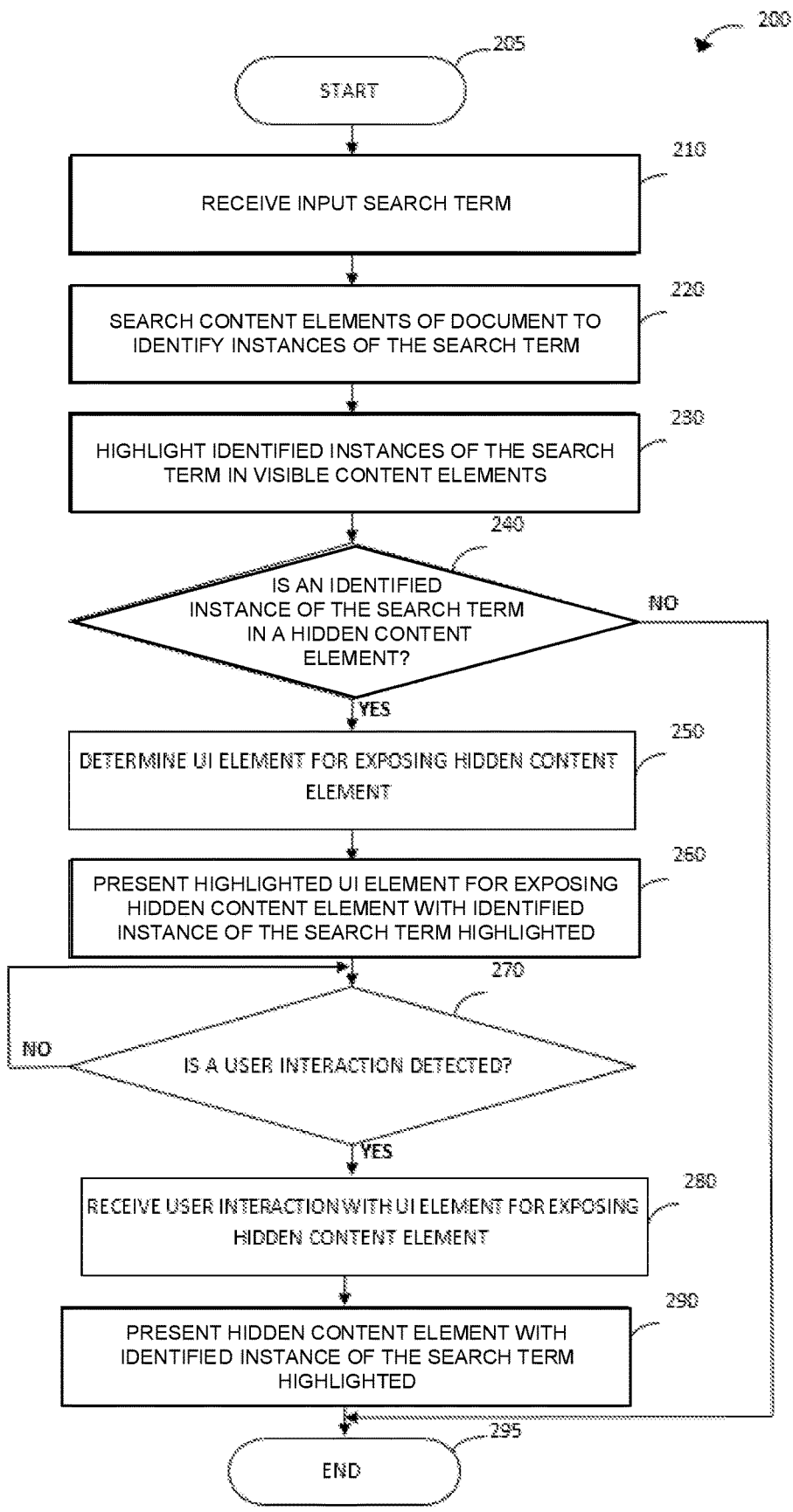
FIG. 2 is a flowchart of a method for enhanced navigation of a document presented by a computing application in accordance with example implementations of the present disclosure.

FIG. 2 is a flowchart of a method 200 for enhanced search and navigation of a document presented by a user application in accordance with example implementations of the present disclosure. In particular, although not exclusively, method 200 may be performed by processing unit 130, in accordance with one or more processing modules 170 comprising enhanced tool module 178 of memory unit 120 of the computing device 110 of FIG. 1.

In example implementations according to the method 200 of FIG. 2, the search and navigation tool is a "Find" tool for locating a search term, such as a text string or other object, within a document currently loaded and presented by a user application. Other example implementations, comprising other types of search and/or navigation tool such as a "Select" tool or a "Replace" tool, are possible and contemplated by the present disclosure.

The method 200 starts at step 205. For example, the method may start in response to a user interaction with a user application for initiating use of the "Find" tool. As the skilled person will appreciate, such user interaction may comprise clicking an icon, selecting a menu option or using a keyboard shortcut (e.g., Cmd/Ctrl+F for the "Find" tool), which causes the display of a user interaction element, such as a graphical user interface (GUI) element of the "Find" tool, for enabling a user to enter a search term as a query.

In step 210 enhanced tool module 178 receives a user input search term via the "Find" tool. In some embodiments, the search term comprises the text string "TEST". Enhanced tool module 178 searches the whole of the document in step 220 to identify instances of the search term, such as "TEST". In the case that the application program is a web browser, in step 220 enhanced tool module 178 may search for the text string in all parts of the code of the html document or by traversing the document object model (DOM) tree representation thereof to find text nodes of elements corresponding to the test string. In the case of other types of application programs, enhanced tool module 178 may search for the text string in all parts of the document in step 220, optionally including any linked content and/or documents.

In step 230, enhanced tool module 178 highlights identified instances of the search term in the visible content elements of the document currently presented to the user by the application. For example, the visible instances of the text string "TEST" may be highlighted in the currently presented document by using a different font or color for the identified text string or its background, or by using underline, bold or italics for the identified text string, or any other method of highlighting the text string to the user.

As the skilled person will appreciate, steps 210 to 230 of FIG. 2 provide equivalent functionality to the conventional navigation tool, such as the "Find" tool, in application programs. However, in accordance with the illustrated method, enhanced tool module 178 in step 220 searches the whole of the document (e.g., html document or equivalent computing file or code) for instances of the search term, such as "TEST", in contrast to conventional "Find" tools, which merely search the currently loaded content of the document (e.g., currently loaded Body of an html document). However, in other example implementations, a conventional "Find" tool may perform steps 210 to 230, based on the currently loaded content. In either case, the subsequent steps 240 to 290 of the method 200 of FIG. 2 may be performed by, or as part of, an enhanced tool based on the whole document (e.g., html document or equivalent), and may be performed automatically, based on application and/or user settings, upon user request or otherwise according to implementation requirements.

At step 240, enhanced tool module 178 determines whether an instance of the search term, such as "TEST," identified in step 220, is within a hidden content element of the document. In particular, as described above, a hidden content element may be a content element that is not currently presented to a user by the user application, for example because it is predetermined that the content element is hidden from view, the content element is in a collapsed part of the html tree (or equivalent), the content element is dynamically generated, or for some other reason. In the illustrated method, while enhanced tool module 178 searches for all instances of the search term in the whole document during step 220, enhanced tool module 178 may determine in step 240 that an instance of the search term "TEST" is within a hidden content element of the document, if in step 230 enhanced tool module 178 was unable to highlight all the instances that were identified in step 220. In other implementations, a hidden content element comprising an instance of the search term may be identified by examining the surrounding code for predetermined characteristics, as described further below.

If in step 240 enhanced tool module 178 determines that no instances of the search term were identified within a hidden content element of the document, the method ends at step 295. However, if enhanced tool module 178 determines in step 240 that there is at least one instance of the search term identified within a hidden content element of the document, the method proceeds to step 250.

In step 250, enhanced tool module 178 determines an element for exposing the hidden content element containing the identified instance(s) of the search term, such as "TEST". For example, enhanced tool module 178 in step 250 may identify a visible content element comprising a user interface (UI) element, with which a user may interact to expose the hidden content element containing the instance(s) of the search term. Alternatively, enhanced tool module 178 in step 250 may generate a UI element for presentation to the user, with which a user may interact to expose or dynamically create the hidden content element containing the identified instance(s) of the search term. Examples of methods performed during step 250 are described below with reference to FIGS. 3 and 4. As the skilled person will appreciate, other techniques for determining a content element, for exposing the hidden content element containing the instance(s) of the search term "TEST" are possible and contemplated by the present disclosure.

In step 260, enhanced tool module 178 presents the UI element for exposing the hidden content element containing the identified instance(s) of the search term "TEST". The UI element is highlighted in the presentation to the user. For example, if enhanced tool module 178 identifies a visible UI element in step 250, in step 260 enhanced tool module 178 may highlight the identified UI element using the same or different highlighting technique used to highlight identified instance(s) of the search term in visible content elements in step 230. Alternatively, if enhanced tool module 178 generates a UI element in step 250, enhanced tool module 178 may present the generated UI element to the user in step 260, with corresponding highlighting or otherwise.

Thus, in step 260, enhanced tool module 178 presents a UI element that provides a navigational guide to enable a user to view instances of the search term that are hidden from the current view of a document presented by the user application. In particular, a user may navigate to and interact with the UI element presented in step 260, in order to expose the hidden content element containing the identified instance(s) of the search term.

Accordingly, in optional step 270, enhanced tool module 178 periodically determines whether a user interaction with the UI element presented in step 260 is detected. For example, in step 270 enhanced tool module 178 may detect a mouse click, keystroke, hover, touchscreen gesture or equivalent user interaction. If enhanced tool module 178 detects a user interaction in step 270, the method proceeds to step 280.

In step 280, enhanced tool module 178 receives a user interaction associated with the UI element for exposing a hidden content element containing an identified instance of the search term, and in step 290 enhanced tool module 178 presents the hidden content element with the identified instance of the search term highlighted. The method then ends at step 295.

As the skilled person will appreciate, some of the steps of the method 200 of FIG. 2 may be repeated, for example in scenarios where the document contains multiple hidden content elements containing the search term. For example, steps 250 and 260 may be repeated for each of the multiple hidden content elements, so as to determine and present a corresponding UI element for exposing the hidden content element. Similarly, steps 270 to 290 may be repeated for each user interaction with one or more of the UI elements for exposing the hidden content elements. As the skilled person will further appreciate, modifications and variations of the method 200 of FIG. 2 are possible and contemplated by the present disclosure.

Furthermore, as described further below with reference to FIG. 3, in some scenarios the search term may be contained within a hidden content element that is exposed indirectly via multiple intermediate UI elements, rather than directly via a single UI element in the view of the currently presented document. In this case, in step 290 enhanced tool module 178 may not immediately present the hidden content element with the instance of the search term highlighted, but instead may present an intermediate UI element for interaction by the user. This process of user interaction and presentation of an intermediate UI element may be repeated until the hidden content element containing the search term is exposed.

Figure 3:
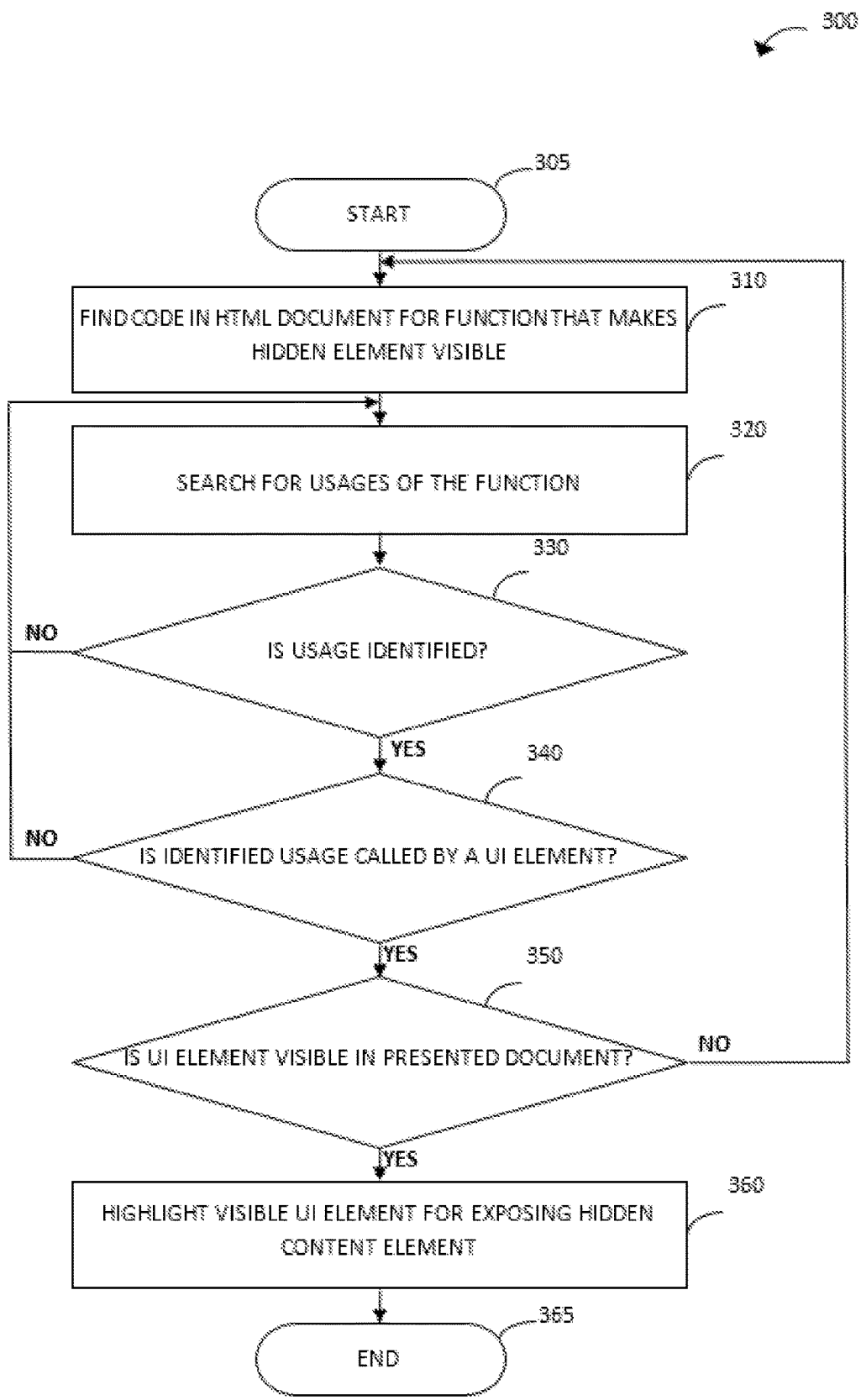
FIG. 3 is a flowchart of a method for revealing hidden content elements during enhanced navigation of a document in accordance with example implementations of the present disclosure.

FIG. 3 is a flowchart of a method 300 for revealing hidden content elements during enhanced search and navigation of a document presented by a user application in accordance with example implementations of the present disclosure. In particular, although not exclusively, the method 300 may be performed by enhanced tool module 178 in one or more of steps 240 to 260 of the method 200 of FIG. 2, and/or by processing unit 130 in accordance with one or more processing modules 170 comprising enhanced tool module 178 of memory unit 120 of the computing device 110 of FIG. 1.

In example implementations according to the method shown in FIG. 3, the search and navigation tool is a "Find" tool in a web browser application, in particular for locating instances of a user input search term comprising a text string within a webpage (i.e., html document) currently presented by the web browser. Other example implementations, comprising other types of search and/or navigation tool in other types of user applications, are possible and contemplated by the present disclosure.

The method 300 starts at step 305. For example, the method may start in response to a determination, by a "Find" tool, that an identified instance of a search term (e.g., text string "TEST") is in a hidden content element, as in step 240 of the method 200 of FIG. 200. In other implementations, the method may be performed in response to a triggering event for enhanced search and/or navigation, as discussed above. In any event, the method starts at step 305 with an identified instance of the search term within a hidden content element of the html document, where the hidden content element has an identifier "ID".

In step 310, enhanced tool module 178 searches the JavaScript® (JavaScript® and all JavaScript®-based trademarks and logos are trademarks or registered trademarks of Oracle Corporation and/or its affiliates), HTML, CSS or equivalent code within the whole of the html document and/or corresponding DOM representation for a function that makes the hidden content element with the identifier "ID" visible. For example, in step 310 enhanced tool module 178 may search for code segments or scripts that include the identifier "ID" in combination with one or more predetermined functions that set the visibility (or equivalent) to "visible", and may identify a function having a function keyword and name.

In step 320, enhanced tool module 178 searches the JavaScript®, HTML, CSS or equivalent code within the html document (or equivalent) for one or more usages of the containing function, identified by the function keyword and name in step 310. For example, in step 320 enhanced tool module 178 may search for code that calls the function identified in step 310, based on the function keyword and name of the identified function that makes the hidden element with the identifier "ID" visible. In example implementations, the function may be called by user interactions. For example, in step 320 enhanced tool module 178 may search for an "onClick" HTML event that calls or otherwise contains a usage of the function, which is associated with the user interaction of "mouse clicking" (or equivalent) on a visible GUI element. Alternatively, in step 320, enhanced tool module 178 search for an "onHover" HTML event that calls or otherwise contains a usage of the function, which is associated with the user interaction of "hovering" over a visible GUI element. Other examples of automatic or user interaction events that call a function are possible and contemplated by the present disclosure.

In step 330, enhanced tool module 178 determines whether a usage of the function is found in step 320. If a usage of the function is found, the method proceeds to step 330, otherwise the method continues with step 320.

In step 340, enhanced tool module 178 determines whether the identified usage of the function comprises a usage of a UI element (e.g., a GUI or equivalent user interaction element). For example, as indicated above, the usage identified by enhanced tool module 178 in step 320 may involve enhanced tool module 178 calling the function based on user interactions such as "mouse clicking" or "hovering" associated with a GUI element (e.g., menu item, icon, etc). If the identified usage of the function does not involve the usage of a UI element, the method returns to step 320. However, if the identified usage of the function comprises the usage of a UI element, the method proceeds to step 350.

In step 350, enhanced tool module 178 determines whether the UI element associated with the identified usage is visible in the currently presented document (e.g., currently loaded html document/webpage). If in step 350 enhanced tool module 178 determines that the UI element is visible, the method proceeds to step 360 wherein enhanced tool module 178 highlights the visible UI element, for example as in step 260 of the method 200 of FIG. 2 as described above. The user is then able to perform the relevant user interaction with the highlighted UI element. The user interaction typically refreshes the webpage, causing the "Find" tool to rerun, which in turn presents the identified instance of the text string highlighted in the previously hidden (and now revealed) content element. The method then ends at step 365.

However, if in step 350 enhanced tool module 178 determines that the UI element associated with the identified usage is not visible, the method returns to step 310 with the UI element treated as the new hidden content element. The method 300 then continues in a loop through steps 320 to 350 until a UI element is found by enhanced tool module 178 that is visible in the currently presented document. In step 360 enhanced tool module 178 then highlights the identified visible UI element, and typically each identified intermediate element in the chain necessary to expose the hidden content element containing the identified instance of the search term, and the method ends at step 365. As the skilled person will appreciate, processing of steps 320 to 350 are repeated in scenarios where the hidden UI element, containing the identified instance of the search term (e.g., the text string "TEST"), is nested or collapsed within a chain of elements such as in an html tree In such scenarios, user interaction with the highlighted UI element will reveal each intermediate UI element within the chain, in turn, until the hidden content element containing the identified instance of the search term is exposed.

In an example of the method 300 of FIG. 3, presented below, a user of the "Find" tool searches for the text string "item 1" in a webpage currently loaded and presented by a web browser. The whole html document received from the originating web server is searched for the raw text "item 1". A hidden content element is identified with the id: "submenu" having the search term "item 1" and with the CSS style set to "visibility: hidden:" in the section of code shown in bold below:

```
<script>
    function: showMenu( ) {
        document.getElementById("submenu").style.
        visibility = visible;
    }
```

```
        </script>
    </head>
    <body>
        <nav id="navbar" class="navbar">
            <div id="menu" onclick=showMenu( )>
                Menu
            </div>
        </nav>
        <div id="submenu" style="visibility: hidden:">
            <p>Item 1</p>
            <p>Item 2</p>
            <p>Item 3</p>
        <div>
    </body>
</html>
```

Thus, the method 300 starts at step 305 with the "Find" tool identifying the hidden content element with the id: "submenu".

In step 310, enhanced tool module 178 searches the html document code for a function that sets the visibility of the identified hidden content element "submenu" to visible, and identifies the function "showMenu( )" in the section of code shown in bold below:

```
        <script>
            function: showMenu( ) {
                document.getElementById("submenu").style.
                    visibility = visible;
            }
        </script>
    </head>
    <body>
        <nav id="navbar" class="navbar">
            <div id="menu" onclick=showMenu( )>
                Menu
            </div>
        </nav>
        <div id="submenu" style="visibility: hidden:">
            <p>Item 1</p>
            <p>Item 2</p>
            <p>Item 3</p>
        <div>
    </body>
</html>
```

Step 320 searches the code for a call or usage of the identified function "showMenu( )", and finds a usage in the section of code shown in bold below:

```
        <script>
            function: showMenu( ) {
                document.getElementById("submenu").style.
                    visibility = visible;
            }
        </script>
    </head>
    <body>
        <nav id="navbar" class="navbar">
            <div id="menu" onclick=showMenu( )>
                Menu
            </div>
        </nav>
        <div id="submenu" style="visibility: hidden:">
            <p>Item 1</p>
            <p>Item 2</p>
            <p>Item 3</p>
        <div>
    </body>
</html>
```

In step 330 determines that the above usage of the function "showMenu( )" is identified. In particular, the identified usage is that the element id "menu" calls the "showMenu( )" function. In step 340, enhanced tool module 178 determines that the identified usage is a user interaction (i.e., "onclick" event) with a UI element with the identifier "menu". In step 350, enhanced tool module 178 then determines whether the element "menu" is visible. In this example, the code indicates that the CSS style of the element "menu" is set to visible (not shown), indicating that the UI element "menu" is visible in the document presented to the user.

Accordingly, in step 360, enhanced tool module 178 highlights the UI element "menu" in the document presented to the user, in the same way as other identified instances of the search term "item 1" are highlighted in the presented document. Thus, when the user interacts with (i.e., clicks on) the UI element "menu", the corresponding content element, including the search term "item 1", is exposed. In this example, the menu options "item 1", "item 2" and "item 3" are shown, for example as a drop-down list. The change in loaded and presented content, resulting from the user interaction, constitutes a page change event. In consequence, the "Find" tool is rerun, which, in turn, identifies and highlights the no longer hidden instance of "item 1" in the menu options.

In the method 300 of FIG. 3, enhanced tool module 178 identifies a function, the output of which makes the hidden content element containing the search term visible. As the skilled person will appreciate, in other scenarios, the hidden content element may be made visible by the output of a class instead of a function. Accordingly, in example implementations, the method 300 of FIG. 3 may be modified to allow enhanced tool module 178 to identify a class (and usages thereof), in addition or as an alternative to identifying a function as in steps 310 and 320 described above. As the skilled person will further appreciate, step 340 of the method 300 of FIG. 3 may require iterative processing to identify usages of the function (or class) that are called by a UI element. For example, in some scenarios, a non-UI element may call the function (or class). In such a scenario, in step 340 enhanced tool module 178 may first identify the function call by the non-UI element, and then identify a UI element that calls that non-UI element (and/or any intermediate non-UI elements).

Figure 4:
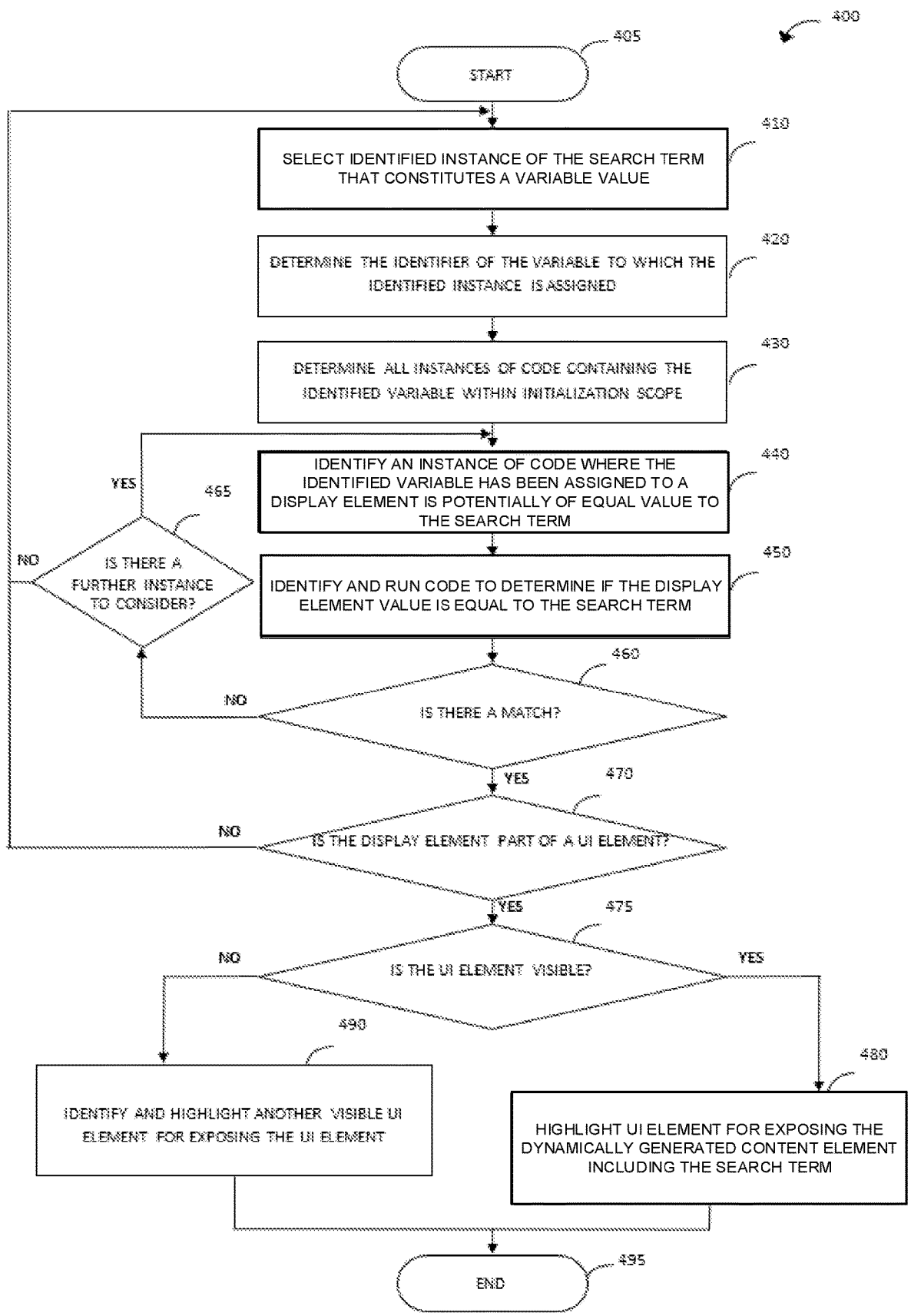
FIG. 4 is a flowchart of another method for revealing hidden content elements during enhanced navigation of a document in accordance with example implementations of the present disclosure.

FIG. 4 is a flowchart of another method 400 for revealing hidden content elements during enhanced search and navigation of a document presented by a user application in accordance with example implementations of the present disclosure. In particular, although not exclusively, the method 400 may by performed by one or more of steps 240 to 260 of the method 200 of FIG. 2, and/or by processing unit 130 in accordance with one or more processing modules 170 comprising enhanced tool module 178 of memory unit 120 of the computing device 110 of FIG. 1.

In example implementations according to the method shown in FIG. 4, the navigation tool is a "Find" tool in a web browser application, in particular for locating instances of a user input search term comprising a text string within a webpage (i.e., html document) currently loaded and presented by the web browser. Other example implementations, comprising other types of search and/or navigation tool in other types of user applications, are possible and contemplated by the present disclosure.

In contrast to the method of FIG. 3, which reveals hidden content elements that inherently contain the search term, the method of FIG. 4 is used for revealing content elements having dynamically generated content containing the search term.

The method 400 starts at step 405. For example, the method may start in response to a determination, by a "Find" tool, that one or more identified instances of a search term (e.g., the input test string "TEST") is in a hidden content element, as in step 240 of the method 200 of FIG. 200. In other implementations, the method may be performed in response to a triggering event for enhanced search and/or navigation, as discussed above. In any event, the method starts at step 405 with one or more identified instances of the search term "TEST" within a hidden content element of the html document.

In step 410, enhanced tool module 178 selects an identified instance of the search term that has a variable value. In particular, in step 410 enhanced tool module 178 may receive all identified instances of the search term, such as the text string "TEST", which have been found within hidden content elements in the whole html document (or equivalent), and identifies all instances of the search term that are "variables" (or equivalent). For example, in step 410 enhanced tool module 178 may identify instances of the search term that are contained in the html code within single quotes (i.e., written as "TEST") or within double quotes (i.e., ""TEST""). As the skilled person will appreciate, terms that appear with single or double quotes in html code correspond to variable values, and therefore may be dynamically generated according to one of a plurality of possible values for the variable. Identified instances of the search term in hidden content elements that do not appear in single or double quotes may be names of variables and functions, which are not relevant for to the "Find" tool as they do not represent document content (i.e., are not part of the html Body) and so are never presented to the user. Accordingly, in step 410 enhanced tool module 178 selects an identified instance of the search term within a hidden content element that has a variable value for processing.

In step 420, enhanced tool module 178 determines an identifier of the variable, to which the identified instance of the search term has been assigned. For example, in step 420 enhanced tool module 178 may identify the name or other identifier of the variable that may hold the value that matches the search term. Thus, in step 420 enhanced tool module 178 identifies the variable for which the instance of the search term may be dynamically generated.

In step 430 enhanced tool module 178 determines all instances of code containing the variable identified in step 420 within the initialization scope to the identified instance of the search term. In particular, in step 430 enhanced tool module 178 may search the html document code, using the name or identifier of the variable, and find all instances of code containing the variable, within the scope of its initialization to the target instance of the search term. As the skilled person will appreciate, in step 430 enhanced tool module 178 looks to find the point or location within the code where the variable (potentially) leads to the identified instance of the search term by traversing the code, starting from the code containing the identified instance of the search term, to find associated instances of the variable.

In step 440 enhanced tool module 178 identifies an instance of code where the identified variable is assigned to an element that is presented (herein a "display element") that potentially has a value that matches the search term. For example, in step 440 enhanced tool module 178 may search the instances of code determined in step 430 to identify a section of code, in which the variable is assigned to a display element, such as a DOM element, innerHTML or innerText element (or equivalent). In example implementations, in step 440 enhanced tool module 178 may compile the instances of code identified in step 430, in order to identify a section of code that ties the target variable to a particular DOM element, innerHTML or innerText element (or equivalent). As the skilled person will appreciate, a value for a DOM, innerHTML or intertext element (or equivalent) may be dynamically generated and included in a UI element as part of a presented webpage. Thus, the section of code identified in step 440 may further identify a UI element containing the display element, to which the variable that may potentially match the search term is assigned.

In step 450 enhanced tool module 178 identifies and runs the code that assigns a value to the variable in the identified display element (e.g., DOM, innerHTML or intertext element), to determine whether the element value matches the search term. In step 460, enhanced tool module 178 considers whether there is a match. If the display element value does not match the search term, then the search term is not dynamically generated in the UI element, and the method continues with step 465. In step 465, enhanced tool module 178 determines whether there are further instances of code to be considered, and if so returns to step 440, where enhanced tool module 178 selects another instance. If there are no further instances to consider, the method returns to step 410. However, if in step 460, enhanced tool module 178 determines the display element value does match the search term, then the display element to which the variable is assigned has a value that matches the search term. Accordingly, the search term will be dynamically generated in the UI element, and the method proceeds to step 470.

As the skilled person will appreciate, steps 440, 450 and 460 may be performed in any order or may be combined into a single step, according to implementation requirements. Furthermore, steps 440, 450 and 460 represent just one possible technique for determining the element (if any) in the document code that presents (e.g., displays) the dynamically generated identified instance of the search term to the user. In particular, the technique identifies the pathway to the hidden content element comprising the dynamically generated search term, by traversing the document code as described above. However, other techniques for identifying the route or pathway, involving examining and processing the document code or otherwise, will be apparent to the skilled person. Such alternative techniques are possible and contemplated by the present disclosure.

In step 470, enhanced tool module 178 determines whether the display element is part of a UI element, based on the section of code identified in step 440. If in step 470 enhanced tool module 178 determines that the display element is not part of a UI element, then the method returns to step 410. However, if in step 470 enhanced tool module 178 determines that the element is part of a UI element, the method proceeds to step 475.

In step 475 enhanced tool module 178 determines whether the UI element is visible, and thus currently presented in the html document/webpage to the user. If in step 475 enhanced tool module 178 determines that the UI element is visible, the method proceeds to step 480, where enhanced tool module 178 highlights the UI element in the document presented to the user. For example, the UI element is highlighted in the same way as other identified instances of the search term "TEST" are highlighted in the presented document. Thus, when the user interacts with the highlighted UI element, the corresponding content including the search term is exposed, as described above. The method then ends at step 495.

Alternatively, if in step 475 enhanced tool module 178 determines that the UI element is hidden, the method proceeds to step 490. In step 490, enhanced tool module 178 identifies another visible UI element for exposing the UI element identified in step 440. For example, in step 490 enhanced tool module 178 may perform sub-steps equivalent to steps 310 to 350 of the method 300 of FIG. 3, to find the corresponding visible UI element, which is then highlighted. The method then ends at step 495. Once again, when the user interacts with the highlighted UI element, it will expose a further highlighted intermediate UI element as described above, until the UI element containing the dynamically generated search term is exposed.

As the skilled person will appreciate, the method of either FIG. 3 or FIG. 4 may be used in the method of FIG. 2 to identify instances of the search term in different types of hidden content element, according to application and/or user requirements. In some embodiments, the methods of FIGS. 3 and 4 may be performed in combination, for example consecutively or concurrently.

In example implementations of the present disclosure, a computer program product 190 may be provided, as shown in FIG. 1. The computer program product 190 may include computer readable media 192 having storage media 194 and program instructions 196 (i.e., program code) embodied therewith. The program instructions 196 may be loaded onto memory unit 120 of computing device 110 via I/O unit 140, for example by one of user interface devices 150. The program instructions 196 may comprise an enhanced tool module 178, for performing one or more of the methods of FIGS. 2, 3 and 4 as described above. In particular, enhanced tool module 178 may be associated with a processing module 170 comprising a web browser. The web browser may receive an html document, corresponding to a webpage selected by a user, from web server 180 over the network 160 via input/output unit 140 of computing device 110. The user may then utilize the enhanced tool 178 for search and navigation of the presented html document/webpage. As described above, in accordance with example implementation of the present disclosure, the enhanced tool searches for identified instances of a search term in the whole of the html document/webpage, and highlights an element presented on the webpage for user interaction, to enable the user to expose and view an identified instance of the search term in an otherwise hidden content element.

Accordingly, the present disclosure provides techniques for improved search and navigation of a document presented by a user application. In particular, instances of a search term in hidden content elements are identified, and the user is presented with means to view such hidden content elements by navigation via one or more UI elements. Rather than merely considering the document code for the currently loaded/presented document, in accordance with the present disclosure the document code for the whole document is processed. In particular, the document code is searched in order to identify instances of the search term within hidden content elements. For each identified instance of the search term within a hidden content element, the document code is then traversed, or otherwise processed, to identify a pathway or route to expose the hidden content element by means of a UI element. A visible UI element may be generated or highlighted in the presented document as the abovementioned means to view the hidden content element, which may involve navigation thereto via one or more intermediate UI elements.

Whilst the present disclosure has been described and illustrated with reference to example implementations, the skilled person will appreciate that the present disclosure lends itself to many different variations and modifications not specifically illustrated herein.

The present disclosure encompasses a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some example implementations, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to example implementations of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various example implementations of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various example implementations of the present disclosure have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the example implementations, the practical application or technical improvement over technologies found in the marketplace, or to enable others of ordinary skill in the art to understand the implementations disclosed herein.

What is claimed is:

1. A computer implemented method, comprising:
   receiving a user-input search term in a search tool for finding instances of the search term in an html document currently presented to the user;
   searching all parts of the code of the html document including currently presented portions of the html document presented to the user for instances of the search term, searching all parts of the code of the html document including searching of portions of the html document encompassed by html body tags if presented to the user;
   searching all parts of the code of the html document not presented to the user for instances of the search term;
   identifying an instance of the search term in a hidden content element of the html document encompassed by html body tags, wherein the hidden content element comprises an element that is dynamically generated but not presented to the user and the dynamically generated hidden content element is a variable encompassed by the html body tags; and
   presenting to the user the identified hidden content element of the html document with the identified instance of the search term highlighted.

2. The method of claim 1, further comprising:
   identifying, based on an identifier of the hidden content element, a function or class in the document code that makes the hidden content element visible;
   identifying, based on an identifier of the function or class, a usage of the function or class, wherein the identified usage of the function or class is called by a calling content element; and
   determining the calling content element as the content element responsible for exposing the hidden content element, when the calling content element comprises a user interaction element.

3. The method of claim 2, further comprising the steps of:
   responsive to determining that the calling content element does not comprise a user interaction element, determining that the calling content element is a second hidden content element; and
   determining a content element for exposing the second hidden content.

4. The computer-implemented method of claim 1, wherein the determined content element is presented to the user via a user interface.

5. The computer-implemented method of claim 1, wherein the user interaction is a mouse click, keystroke, hover, or touchscreen gesture.

6. A system comprising:
   a computing device comprising a processing unit and a memory unit, wherein the computing device is configured to present html documents to a user and to enable the user to search for search terms using a search tool, wherein the processing unit is configured to carry out the steps of:

receiving a user-input search term in the search tool for finding instances of the search term in an html document currently presented to the user;

searching all parts of the code of the html document including currently presented portions of the html document presented to the user for instances of the search term, searching all parts of the code of the html document including searching of portions of the html document encompassed by html body tags if presented to the user;

searching all parts of the code of the html document not presented to the user for instances of the search term;

identifying an instance of the search term in a hidden content element of the html document encompassed by html body tags, wherein the hidden content element comprises an element that is dynamically generated but not presented to the user and the dynamically generated hidden content element is a variable encompassed by the html body tags and;

presenting to the user the identified hidden content element of the html document with the identified instance of the search term highlighted.

7. The system of claim 6, wherein the processing unit is configured to perform the steps of:

identifying, based on an identifier of the hidden content element, a function or class in the document code that makes the hidden content element visible;

identifying, based on an identifier of the function or class, a usage of the function or class, wherein the identified usage of the function or class is called by a calling content element; and determining the calling content element as the content element responsible for exposing the hidden content element, when the calling content element comprises a user interaction element.

8. The system of claim 7, wherein the processing unit is further configured to perform the steps of:

responsive to determining that the calling content element does not comprise a user interaction element, determining that the calling content element is a second hidden content element; and determining a content element for exposing the second hidden content.

9. A computer program product comprising a computer readable storage medium having program instructions embodied therewith, wherein the program instructions are executable by a processor to cause the processor to:

receive a user-input search term in a search tool for finding instances of the search term in an html document currently presented to the user;

search all parts of the code of the html document including currently presented portions of the html document presented to the user for instances of the search term, searching all parts of the code of the html document including searching of portions of the html document encompassed by html body tags if presented to the user;

search all parts of the code of the html document not presented to the user for instances of the search term;

identify an instance of the search term in a hidden content element of the html document encompassed by html body tags, wherein the hidden content element comprises an element that is dynamically generated but not presented to the user and the dynamically generated hidden content element is a variable encompassed by the html body tags;

presenting to the user the identified hidden content element of the html document with the identified instance of the search term highlighted.

\* \* \* \* \*